June 22, 1943.  C. D. YOUNG  2,322,680
SPRING SUSPENSION FOR RAILWAY TRUCKS AND THE LIKE
Filed July 16, 1941  2 Sheets—Sheet 1
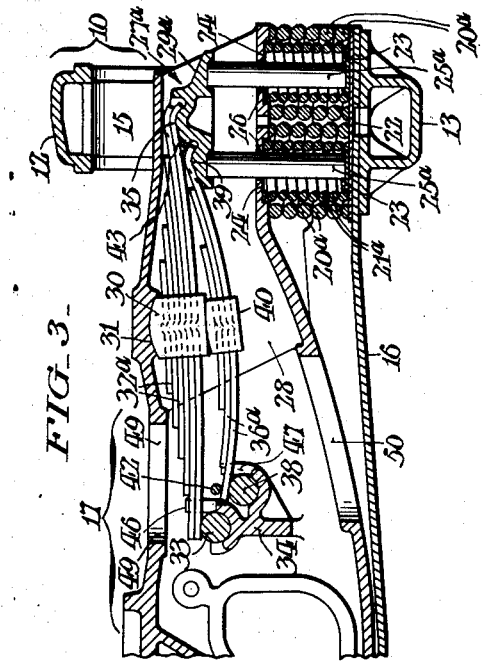
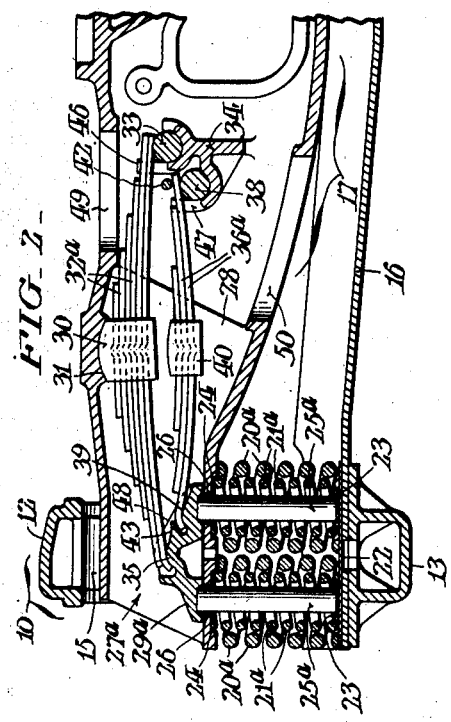
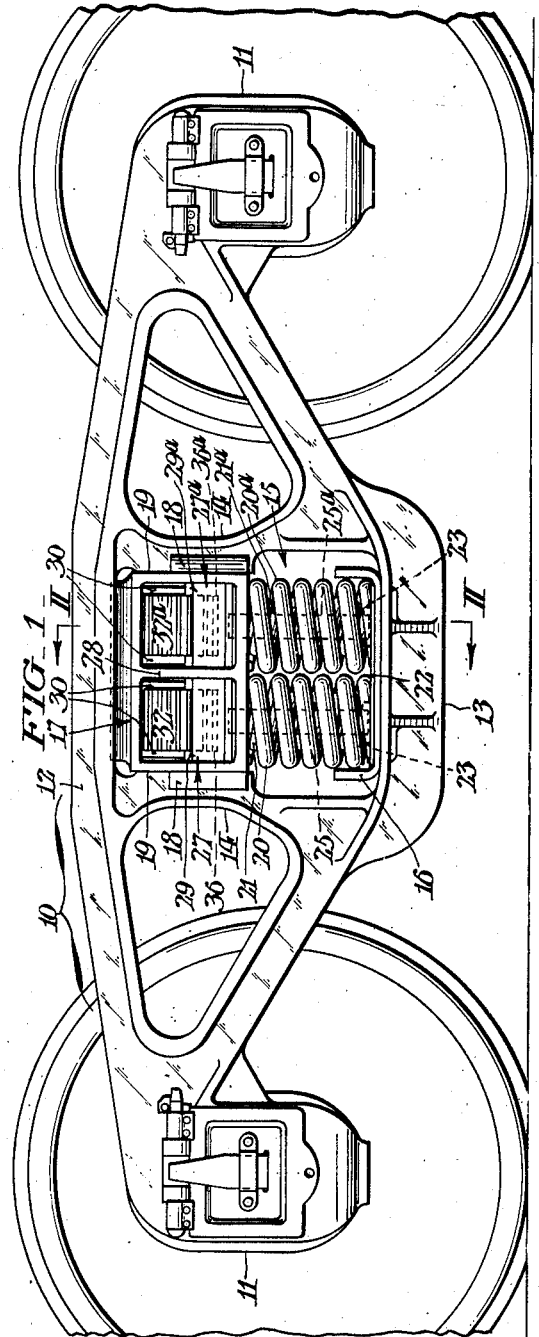
INVENTOR:
Charles D. Young,
BY Paul & Paul
ATTORNEYS

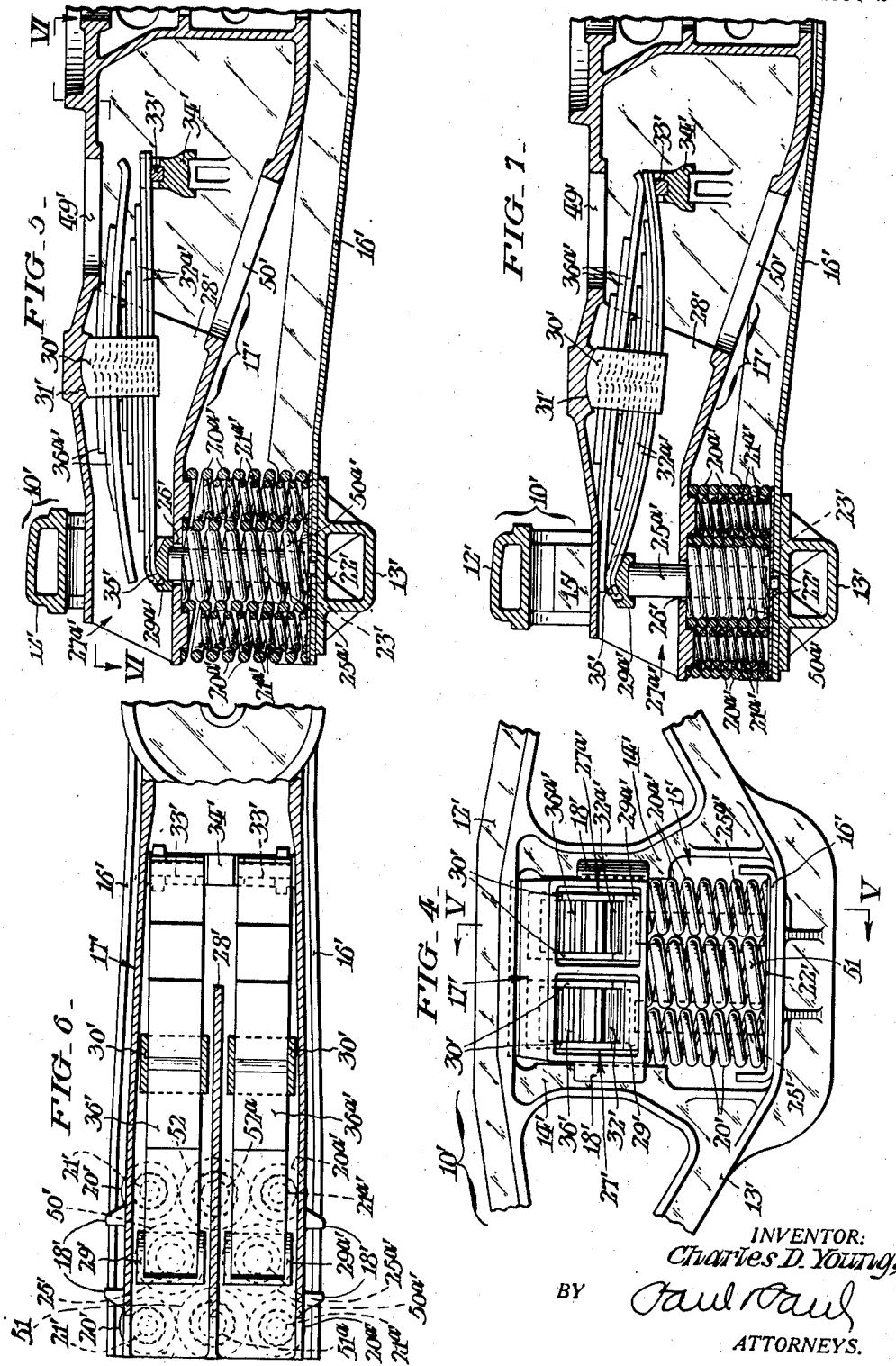

Patented June 22, 1943

2,322,680

UNITED STATES PATENT OFFICE 2,322,680

SPRING SUSPENSION FOR RAILWAY TRUCKS AND THE LIKE

Charles D. Young, Haverford, Pa.

Application July 16, 1941, Serial No. 402,574

9 Claims. (Cl. 105—197.1)

This invention relates to spring systems for railway trucks and the like. More particularly it is concerned with truck spring suspensions of the type shown in U. S. Patent No. 2,199,907 granted to Charles D. Barrett and Charles R. Whitehead on May 7, 1940, wherein each end of the truck bolster is supported from beneath by resilient means within the window of the corresponding side frame of the truck, and wherein one or more leaf springs extend lengthwise of a hollow in the bolster end and have free ends supported from said frame within the window independently of the resilient means aforesaid.

In connection with a truck incorporating a spring system of the above character, I aim to secure greater flexibility of the spring action normally under light loads and at the same time make it possible to increase the maximum load capacity of the system.

These desirable advantages I attain in practice as hereinafter set forth in greater detail, through provision, in association with the leaf springs within the bolster ends, of supplemental or helper spring means which are normally relaxed and therefore inoperative under light loads, but which come into play after the leaf springs are flexed to a predetermined extent, to increase the resistivity of said leaf springs when the load is augmented.

Other objects and attendant advantages will appear from the following description of the attached drawings; wherein Fig. 1 is a view in side elevation, of a railway car truck conveniently embodying my invention.

Fig. 2 is a fragmentary view in section taken longitudinally through the bolster as indicated by the angled arrows II—II in Fig. 1 and showing the normal condition of the spring system when under light load.

Fig. 3 is a view corresponding to Fig. 2 but of the opposite side of the truck showing the action of the spring system under heavy loads.

Fig. 4 is a fragmentary view corresponding to Fig. 1 showing an alternative embodiment of my invention.

Fig. 5 is a fragmentary view in section taken as indicated by the angled arrows V—V in Fig. 4 longitudinally through the truck bolster, and showing the normal condition of the alternative spring system under normal load conditions.

Fig. 6 is a fragmentary view partly in plan and partly in horizontal section taken as indicated by the angled arrows VI—VI in Fig. 5; and Fig. 7 is a view like Fig. 5 showing the condition of the alternative spring system under maximum load.

Referring first more particularly to Figs. 1–3, the truck chosen for illustration herein is, generally speaking, of the A. A. R. standard type such as are ordinarily used on freight cars. As exemplified in Fig. 1, each side frame 10 of the truck has wheel axle journal boxes 11 at opposite ends thereof which are connected by an upper compression member 12 and a lower tension member 13, said members being integrally joined as ordinarily by laterally spaced vertical struts 14, 14 which define a bolster window 15 centrally of the frame. A channel section spring plank 16 serves as a connecting member between the frame 10 and the corresponding frame (not shown) at the opposite side of the truck. The truck bolster designated comprehensively by the numeral 17 is of hollow construction, has its end within the window 15 of the side frame, and is provided with retaining shoulders 18 for engaging the outer and inner sides of the usual guide surfaces 19 on the struts 14.

The end of the bolster is supported by four nested groups of helical springs 20, 21 and 20a, 21a which are arranged in pairs side by side within the window 15 and said pairs aligned in the direction of the bolster, with their lower ends resting upon a spring plate 22 within the channel of the spring plank 16. As shown, the lower ends of the inner springs 21, 21a of each of these groups are held centered by upstanding annular flanges on auxiliary plates 23 superimposed upon the spring plates 22, and have their upper ends engaged in centering recesses 24 formed in the bottom wall of the bolster end. Also as shown, the auxiliary plates 23 are recessed for the centering of columns or posts 25, 25a whereof the transversely aligned pairs extend upward through the coiled spring groups and through clearance openings 26 in the bottom wall of the bolster end and moreover extend into subdivisions 27, 27a set apart in the latter by a central longitudinally extending partition 28. Supported by the columns or posts 25, 25a within the subdivisions 27, 27a are saddles 29, 29a which are recessed in their bottoms to receive the upper ends of said columns or posts. Disposed within the subdivisions 27, 27a of the bolster end with their straps 30 rounded at the top and engaging correspondingly configured bearing surfaces 31 on the upper wall of the bolster 17 are leaf springs 32, 32a. The inner ends of these leaf springs 32, 32a engage a renewable cylindric bearing member in the form of a bar 33 recessed into a crosswise web 34 within the bolster hollow; while the outer ends of said springs are curved to engage correspondingly rounded central ridges 35 on the saddles 29, 29a. Insofar as briefly described up to this point, the construction of the spring suspension is substantially the same as that featured in the Barrett et al. patent hereinbefore referred to.

In order to supplement the action of the leaf springs 32, 32a in such a suspension system, I have provided, in accordance with my invention, supplemental or helper spring means in association with said leaf springs. This supplemental spring means includes an additional pair of normally relaxed leaf springs 36, 36a which are arranged in superposed relation to the leaf springs 32, 32a, and which, in this instance, have their leaves arched oppositely to those of said springs 32, 32a. The inner ends of the supplemental leaf springs 36, 36a rest upon a replaceable bearing bar 38 which is seated within another recess in the cross web 34 within the bolster 17, the outer ends of said supplemental springs engaging ridges 39 on the saddles 29, 29a inward of the ridges 35. It is to be noted the bearing bar 38 and the saddle ridges 39 are respectively at levels below the bearing bar 33 and ridge 35 so that normally the center straps 30, 40 of the springs 32, 36 and 32a, 36a are vertically spaced relative to each other as illustrated in Fig. 2, with the result that the leaf springs 32, 23a may function alone under comparatively light loads. As further shown in Fig. 2, the inner and outer ends of the supplemental springs 36, 36a are held against upward displacement relative to the bearing bar 38 and ridges 35 and 39 on the saddles 29, 29a respectively by a transverse retaining pin 42 and by projections 43 which overhang said ridges. From Fig. 1 it will be further observed that the spring straps 30 and 40 are of a width to fit closely within the subdivisions 27, 27a of the bolster end; and from Fig. 2, that the recesses for the bearing members 33 and 38 in the cross web 34 and the saddles 29, 29a are respectively provided with side flanges 46, 47 and 48 between which the ends of the springs 32, 32a and 36, 36a have a relatively snug fit. As a consequence of the provisions just referred to, the springs 32, 32a and 36, 36a are confined solely to up and down flexure within the bolster 17. For convenience of introducing and manipulating the various parts of the suspension in assembling the truck, the bolster 17 is left open at its end, and is moreover provided, top and bottom adjacent its ends, with access openings 49 and 50, see Figs. 2 and 3.

Due to the liberal vertical interval normally between the springs 32, 32a and 36, 36a, the springs 32, 32a have a comparatively wide range of action under normal loads. Accordingly, the bands 30 of the springs 32, 32a do not ordinarily come into contact with the bands 40 of the springs 36, 36a. However, when the springs 32, 32a are flexed beyond a definite amount under increased loads, the center bands 30 thereof will finally engage the center bands 40 of the supplemental springs 36, 36a, whereupon the latter will function to augment the resistivity of the said springs 32, 32a. Fig. 3 shows the spring system under maximum load with the helical spring groups 20, 21 and 20a, 21a compressed "solid," with the center bands 30 and 40 of the leaf springs 32, 32a and 36, 36a in full contact, and with said leaf springs in full compression. The snubbing action due to friction between the leaves of the springs 32, 32a and 36, 36a will obviously enhance the riding qualities of the truck.

Except as hereinafter specifically pointed out, the alternative form of my invention shown in Figs. 4–7 is generally similar to the first described embodiment. Accordingly, in order to obviate the necessity for repetitive description, all corresponding parts in the alternative form have been identified with the same reference characters previously employed, with the addition in each instance, however, of a prime for convenience of more ready distinction. In the alternative arrangement, the supplemental leaf springs 36′, 36a′ are disposed above the leaf springs 32′, 32a′ and combined with the latter by single straps 30′. A further difference will be noted in that the ends of the supplemental leaf springs 36′, 36a′ are free and unsupported; while, in the first embodiment, the ends of the springs 32′, 32a′ respectively engage in bearing members 33′ on a cross piece 34′ within the bolster 17′ and saddles 29′, 29a′ which are supported at the tops of columns or posts 25′, 25a′, of which there are but two in this instance. These posts 25′, 25a′ are respectively surrounded by single helical springs 50′, 50a′ and are located in the medial plane of the side frame 10′ centrally beneath the outer ends of the leaf springs 32′, 32a′ and between nested coil springs 20′, 21′ and 20a′, 21a′ which correspond to the coiled spring groups 20, 21 and 20a, 21a of the first embodiment. It is to be particularly noted that the springs 20′, 21′, 20a′, 21a′ are more widely spaced transversely of the side frame 10′ to enable use of springs 50, 50a of relatively large diameter, and that they are also more widely spaced longitudinally of the side frame to accommodate between them, in corresponding planes, additional groups of nested coil springs 51, 51a and 52, 52a in the central plane of the bolster 17′. It is of course to be understood that such an amplified coil spring arrangement may, is desired or found advantageous in practice, be incorporated in the first described embodiment of my invention. The function of the alternative form of spring suspension is like that of the first described embodiment except that here the ends of the supplemental springs 36′, 36a′ come in contact respectively with the ends of the leaf springs 32′, 32a′ when the load is increased. Otherwise the ends of the supplemental springs 36′, 36a′ are entirely free, and said springs fully relaxed as hereinbefore pointed out and as illustrated in Fig. 5.

Having thus described my invention, I claim:

1. In a truck, the combination with a side frame having a bolster window, and a hollow bolster with an end in said window; of a spring suspension including coil spring means in said window under the bolster and yieldingly supporting the latter from said side frame; leaf spring means mounted inside the bolster lengthwise thereof to flex up and down therein with its outer end in the side frame and within the hollow bolster end; column means under said outer end of the leaf spring means supporting the latter from the side frame member at the bottom of said window independently of the coil spring means, whereby said coil spring means and said leaf spring means support the bolster in parallel with one another; and normally relaxed supplemental leaf spring means operative to augment the resistivity of the first leaf spring when the latter has been flexed to a predetermined extent, said supplemental leaf spring means being mounted within the hollow of the bolster lengthwise thereof below and normally out of contact with the first leaf spring means and having its outer end resting on the aforesaid column means.

2. In a truck, the combination with a side frame having a bolster window, and a hollow bolster with an end in said window; of a spring suspension including coil spring means in said window under the bolster and yieldingly supporting the latter from said side frame; leaf spring means mounted inside the bolster lengthwise thereof to flex up and down therein with its outer end in the side frame and within the hollow bolster end; column means under said outer end of the leaf spring means supporting the latter from the side frame member at the bottom of said window independently of the coil spring means, whereby said coil spring means and said leaf spring means support the bolster in parallel with one another; and normally relaxed supplemental leaf spring means operative to augment the resistivity of the first leaf spring when the latter has been flexed to a predetermined extent, said supplemental leaf spring means being mounted within the hollow of the bolster lengthwise thereof above the first leaf spring means with its ends normally out of contact with the first leaf spring means.

3. In a truck, the combination with a side frame having a bolster window and a hollow bolster with an end in said window, of a spring suspension including a pair of leaf springs of substantially equal length mounted in superposed relation within the bolster longitudinally thereof with their outer ends within the frame window and within the bolster end, the mid portion of one of the springs serving as a support for the bolster end, and the other spring being normally relaxed and out of operative contact with the first spring but effective upon engagement with the first mentioned spring to augment the resistivity thereof when it has flexed to a predetermined extent, and bearings respectively on the frame and within the bolster against which the opposite ends of the springs react.

4. In a truck, the combination with a side frame having a bolster window and a hollow bolster with an end in said window, of a spring suspension including a pair of leaf springs of substantially equal length mounted within the bolster longitudinally thereof with their outer ends within the frame window and within the bolster end; the mid portion of one of the springs serving as a support for the bolster end, the other spring being oppositely bowed with respect to the first mentioned spring and normally relaxed with its mid portion out of contact with the mid portion of said first spring, and bearings respectively at different levels on the frame and within the bolster against which the opposite ends of the springs respectively react.

5. In a truck, the combination with a side frame having a bolster window and a hollow bolster with an end in said window, of a spring suspension which includes leaf spring means comprising two sections mounted in superposed relation within the bolster longitudinally thereof with their outer ends within the frame window and within the bolster end, the mid portion of said spring means serving as a support for the bolster end, one spring section being normally relaxed and out of operative contact with the other spring section but effective upon engagement with said other spring section to augment the resistivity of the latter when it has been flexed, and bearings respectively on the frame and within the bolster against which the opposite ends of the spring means react.

6. In a truck, the combination with a side frame having a bolster window and a bolster with an end in said window, of a spring suspension which includes leaf spring means comprising two sections mounted in superposed relation longitudinally of the bolster with their outer ends within the frame window, the mid portion of said spring means serving as a support for the bolster end, one spring section being normally relaxed and out of operative contact with the other spring section but effective upon engagement with said other spring section to augment the resistivity of the latter when it has been flexed, and bearings respectively on the frame and on the bolster against which the opposite ends of the spring means react.

7. The invention according to claim 5, in which the two leaf spring sections are constructed as a unit.

8. The invention according to claim 5, in which the two leaf spring sections are constructed as a unit, and in which the ends of the normally relaxed leaf spring section are normally out of contact with the ends of the other leaf spring section.

9. In a truck, the combination with a side frame having a bolster window and a hollow bolster with an end in said window, of a spring suspension including coil spring means in said window under the bolster for yieldingly supporting the latter from said side frame, leaf spring means comprising two sections mounted in superposed relation longitudinally of the bolster with their outer ends within the frame window, column means under the outer end of one of the leaf spring sections supporting such section from the side frame member at the bottom of said window independently of the coil spring means, whereby said coil spring means and said leaf spring section support the bolster in parallel with one another, and the other leaf spring section being normally relaxed with its ends out of contact with those of the first-mentioned spring section, but effective upon engagement of its ends with the ends of the first mentioned spring section to augment the resistivity of the latter after it has been flexed to a predetermined extent.

CHARLES D. YOUNG.